(12) United States Patent
Fujiwara et al.

(10) Patent No.: US 8,169,502 B2
(45) Date of Patent: May 1, 2012

(54) VIDEO CAMERA

(75) Inventors: Takeshi Fujiwara, Osaka (JP);
Kazuhiro Tsujino, Osaka (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 439 days.

(21) Appl. No.: 12/198,408

(22) Filed: Aug. 26, 2008

(65) Prior Publication Data

US 2009/0066805 A1    Mar. 12, 2009

(30) Foreign Application Priority Data

Aug. 27, 2007 (JP) ................................. 2007-219412

(51) Int. Cl.
*H04N 9/73* (2006.01)

(52) U.S. Cl. ........................................... 348/226.1

(58) Field of Classification Search .......... 348/225.1, 348/226.1, 228.1
See application file for complete search history.

(56) References Cited

U.S. PATENT DOCUMENTS

| | | | |
|---|---|---|---|
| 5,053,871 A * | 10/1991 | Ogawa et al. ............... | 348/366 |
| 5,293,238 A | 3/1994 | Nakano et al. | |
| 5,570,177 A * | 10/1996 | Parker et al. ............. | 356/139.06 |
| 2002/0154225 A1 | 10/2002 | Matsumoto et al. | |
| 2005/0157203 A1* | 7/2005 | Nakakuki et al. ............ | 348/362 |
| 2006/0061669 A1* | 3/2006 | Jang et al. ................ | 348/226.1 |
| 2006/0158531 A1* | 7/2006 | Yanof ..................... | 348/226.1 |
| 2006/0279641 A1* | 12/2006 | Takahashi et al. .......... | 348/226.1 |
| 2007/0046789 A1* | 3/2007 | Kirisawa ................... | 348/226.1 |
| 2007/0146500 A1* | 6/2007 | Lee et al. .................. | 348/226.1 |
| 2007/0153094 A1* | 7/2007 | Noyes et al. ............... | 348/226.1 |
| 2007/0263101 A1* | 11/2007 | Cho et al. .................. | 348/226.1 |
| 2008/0018751 A1* | 1/2008 | Kushida ..................... | 348/226.1 |
| 2008/0291291 A1* | 11/2008 | Kim ........................... | 348/226.1 |
| 2009/0051782 A1* | 2/2009 | Ono et al. .................. | 348/226.1 |

FOREIGN PATENT DOCUMENTS

| | | |
|---|---|---|
| JP | 02-135986 A | 5/1990 |
| JP | 04-373365 A | 12/1992 |
| JP | 08-265652 A | 10/1996 |
| JP | 2003018458 A | 1/2003 |
| JP | 2005-229353 A | 8/2005 |
| JP | 2006-217413 A | 8/2006 |

OTHER PUBLICATIONS

Japanese Office Action dated Jun. 21, 2011, issued in corresponding Japanese Patent Application No. 2007-219412.

* cited by examiner

*Primary Examiner* — Jason Chan
*Assistant Examiner* — Stephen Coleman
(74) *Attorney, Agent, or Firm* — Westerman, Hattori, Daniels & Adrian, LLP

(57) ABSTRACT

An image sensor has an imaging surface irradiated with an optical image of an object scene, and repeatedly generates an object scene image. A CPU repeatedly determines whether or not a specific variation exceeding a reference is generated in the object scene captured by the image sensor, in parallel with a generating process of the object scene image by the image sensor. When a determination result is updated from a negative result to an affirmative result, the CPU waits for an elapse of a designated period, then, determines presence or absence of a generation of a flicker, and executes a flicker countermeasure process, as needed.

9 Claims, 7 Drawing Sheets

VIDEO CAMERA

CROSS REFERENCE OF RELATED APPLICATION

The disclosure of Japanese Patent Application No. 2007-219412 which was filed on Aug. 27, 2007 is incorporated herein by reference.

BACKGROUND OF THE INVENTION

1. Field of the Invention

The present invention relates to a video camera. More particularly, the present invention relates to a video camera that prevents a generation of a flicker resulting from a beat interference between an exposure time period of an imaging element and a blinking cycle of a fluorescent lamp.

2. Description of the Related Art

According to one example of this type of a video camera, an electric-charge accumulation time period, i.e., an exposure time period, of an imaging element is set to the same time period as a blinking cycle (=T) of a fluorescent lamp or to an integral multiple of the cycle T (=2T; 3T; 4T, . . . ). Thereby, a generation of a flicker resulting from a beat interference between the exposure time period of the imaging element and the blinking cycle of the fluorescent lamp is prevented. However, in order to determine whether or not the flicker occurs, an object scene image having several frames to ten-odd frames needs to be referenced. Therefore, when whether or not the flicker occurs is determined all the time, a processor load increases.

SUMMARY OF THE INVENTION

A video camera according to the present invention, comprises: an imager, having an imaging surface irradiated with an optical image of an object scene, for repeatedly generating an object scene image; a determiner for repeatedly determining whether or not a specific variation exceeding a reference is generated in the object scene captured by the imager in parallel with a generating process of the object scene image by the imager; and a flicker processor for determining whether or not a flicker occurs in the object scene image generated by the imager when a determination result of the determiner is updated from a negative result to an affirmative result so as to execute a flicker countermeasure process.

Preferably, the imager generates the object scene image in a first cycle, and the determiner determines whether or not the specific variation is generated in a second cycle longer than the first cycle.

Preferably, the flicker processor executes a flicker determination at a time that a designated period is elapsed from an updating of the determination result.

Further preferably, there is further provided a first changer for changing the designated period according to a variation amount of the object scene captured by the imager.

Preferably, there is further provided a second changer for changing a flicker determining precision according to a variation amount of the object scene captured by the imager.

Preferably, there is further provided an adjustor for repeatedly adjusting an imaging parameter based on the object scene image generated by the imager, in which the determiner executes a determining process by noticing a variation of the imaging parameter adjusted by the adjustor.

Further preferably, the imaging parameter includes an exposure amount. Also, the imaging parameter includes a white-balance adjustment gain.

An imaging-control program product according to the present invention is an imaging-control program product executed by a processor of a video camera comprising an imager having an imaging surface irradiated with an optical image of an object scene, for repeatedly generating an object scene image, the imaging-control program product, comprising: a determining step of repeatedly determining whether or not a specific variation exceeding a reference is generated in the object scene captured by the imager, in parallel with a generating process of the object scene image by the imager; and a flicker processing step of determining whether or not a flicker occurs in the object scene image generated by the imager when a determination result of the determining step is updated from a negative result to an affirmative result so as to execute a flicker countermeasure process.

An imaging control method according to the present invention is an imaging control method of a video camera comprising an imager, having an imaging surface irradiated with an optical image of an object scene, for repeatedly generating an object scene image, the imaging control method, comprising: a determining step of repeatedly determining whether or not a specific variation exceeding a reference is generated in the object scene captured by the imager, in parallel with a generating process of the object scene image by the imager, and a flicker processing step of determining whether or not a flicker occurs in the object scene image generated by the imager when a determination result of the determining step is updated from a negative result to an affirmative result so as to execute a flicker countermeasure process.

The above-described features and advantages of the present invention will become more apparent from the following detailed description of the embodiment when taken in conjunction with the accompanying drawings.

DETAILED DESCRIPTION OF THE PREFERRED EMBODIMENTS

Figure 1:
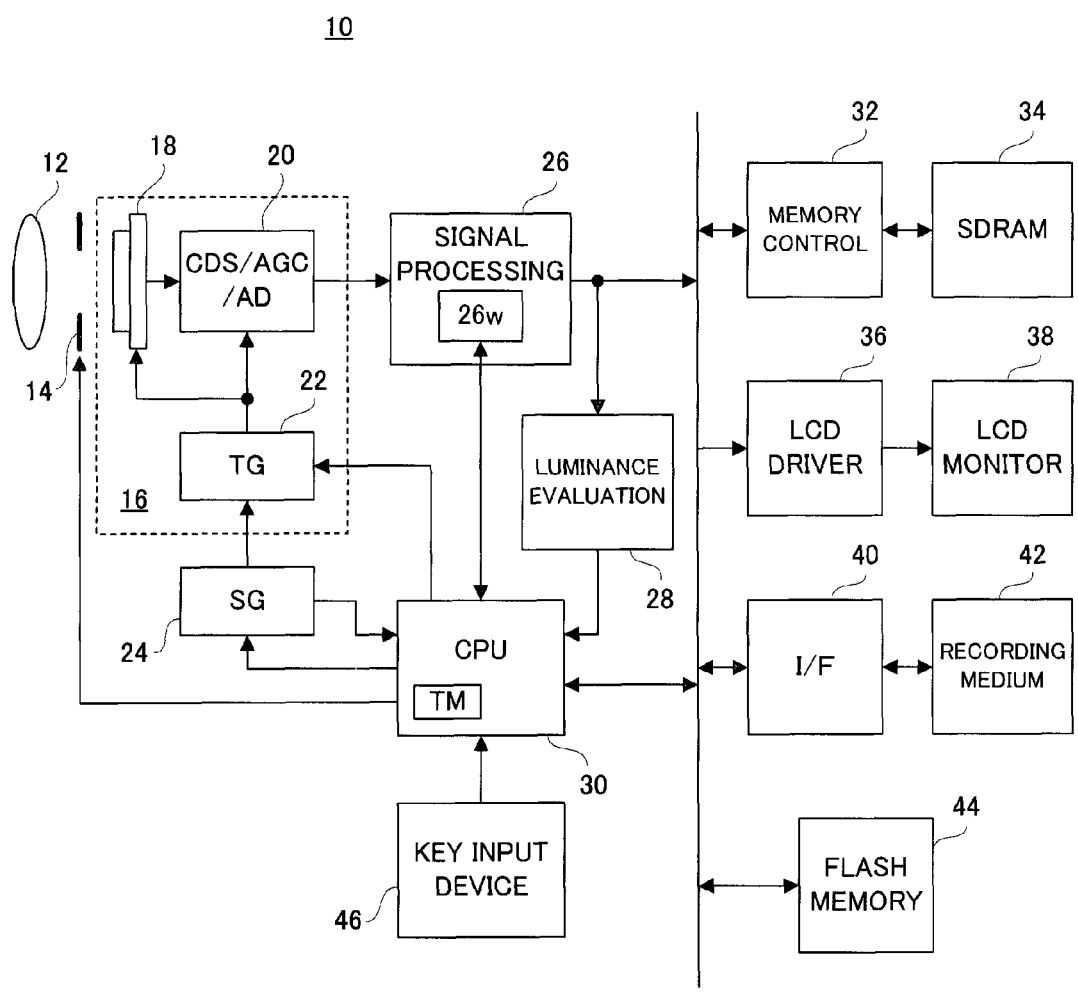
FIG. 1 is a block diagram showing a configuration of one embodiment of the present invention.

With reference to FIG. 1, a video camera 10 of this embodiment includes an optical lens 12 and an aperture unit 14. An optical image of an object scene through these members is irradiated onto a front surface, i.e., an imaging surface, of an imaging portion 18 configuring a CMOS-type image sensor 16, and is then photoelectrically converted. Thereby, a raw image signal formed of electric charges representing an object scene image is generated.

When a power supply is turned on, a CPU 30 instructs a TG Timing Generator) 22 configuring the image sensor 16 to repeatedly perform an exposure and an electric-charge reading-out. The TG 22 applies to the imaging portion 18 a plurality of timing signals responding to a vertical synchronization signal Vsync outputted from an SG (Signal Generator) 24 in order to repeatedly execute an exposure operation of the imaging surface and a reading-out operation of the electric charges obtained thereby. The vertical synchronization signal Vsync is outputted from the SG 24 at each $1/60$ seconds, and the raw image signal of each frame generated in the imaging portion 18 is read out at each $1/60$ seconds in an order according to a raster scanning.

The raw image signal outputted from the imaging portion 18 is subjected to a series of processes, such as a correlation double sampling, an automatic gain adjustment, and an A/D conversion, by a CDS/AGC/AD circuit 20 configuring the image sensor 16. A signal-processing circuit 26 performs processes, such as a white balance adjustment, a color separation, and a YUV conversion, on the raw image data outputted from the CDS/AGC/AD circuit 20, and writes YUV-formatted image data to an SDRAM 34 through a memory control circuit 32. It is noted that the white balance adjustment is executed by a white-balance adjusting circuit 26w.

An LCD driver 36 reads out the image data thus written to the SDRAM 34 through the memory control circuit 34 at each $1/60$ seconds, and drives an LCD monitor 38 based on the read-out image data. As a result, a real-time moving image (through image) of the object scene is displayed on a monitor screen.

A luminance evaluation circuit 28 evaluates brightness (luminance) of the object scene at every $1/60$ seconds based on Y data generated by the signal processing circuit 26. A CPU 30 calculates an optimal EV value based on luminance evaluation values acquired by the luminance evaluation circuit 28, and sets an aperture amount and an exposure time period, which define the calculated optimal EV value, to the aperture unit 14 and the TG 22, respectively. As a result, the brightness of the through image displayed on the LCD monitor 38 is moderately adjusted.

The CPU 30 also calculates an optimal gain for a white balance adjustment, based on RGB-formatted image data outputted from the white-balance adjusting circuit 26w; and sets the calculated optimal gain to the white-balance adjusting circuit 26w. Thereby, a white balance of the through image is moderately adjusted.

When a recording start operation is performed by a key input device 46, the CPU 30 instructs an I/F 40 to perform a recording process. The I/F 40 reads out the image data accommodated in the SDRAM 34 through the memory control circuit 32 at each $1/60$ seconds, and creates a moving-image file including the read-out image data in the recording medium 42. Such a recording process is ended in response to a recording end operation by the key input device 46.

Figure 2:
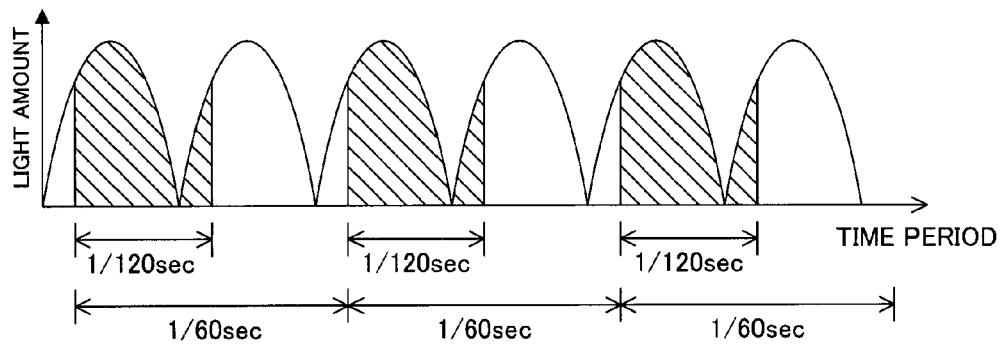
FIG. 2(A) is an illustrative view showing one example of an imaging operation under a fluorescent lamp that is lit by a 6 GHz commercial-use power supply.
FIG. 2(B) is an illustrative view showing one example of an imaging operation under a fluorescent lamp that is lit by a 50 Hz-commercial-use power supply.

With reference to FIG. 2(A) and FIG. 2(B), a fluorescent lamp supplied with a 60-Hz commercial-use power supply is blinked at each $1/120$ seconds while a fluorescent lamp supplied with a 50-Hz commercial-use power supply is blinked at each $1/100$ seconds. Due to a difference in such a blinking cycle, there is a possibility that a flicker resulting from a beat interference between the exposure time period of the imaging surface and the blinking cycle of the fluorescent lamp may be generated.

To solve this, the CPU 30 executes a flicker determining process that references the object scene image captured by the imaging surface, and executes a flicker countermeasure process when a determination result indicates a generation of the flicker. As a result of the flicker countermeasure process being executed, the exposure time period of the imaging surface is set to an integral multiple of $1/120$ seconds corresponding to the 60-Hz commercial-use power supply, and set to an integral multiple of $1/100$ seconds corresponding to the 50-Hz commercial-use power supply.

However, in order to determine whether or not the flicker occurs, an object scene image having several flames to ten-odd frames is needed, and thus, when the flicker determining process is executed all the time, a load of the CPU 30 increases. Therefore, the CPU 30 calculates, as $\Delta EV$, a difference of optimal EV values obtained at different timings, and executes the flicker determining process when the calculated difference $\Delta EV$ exceeds a threshold value TH1.

Further, a determining reference of whether or not the flicker determining process should be started depends upon a variation amount of the optimal EV value, and thus, when an orientation of the imaging surface is frequently changed between in a bright portion and in a dark portion, there is a concern that the flicker determining process is frequently started. Also, it is probable that it takes time from a variation of the object scene in which the difference $\Delta EV$ exceeds the threshold value TH1 until the object scene is stabled.

Figure 3:
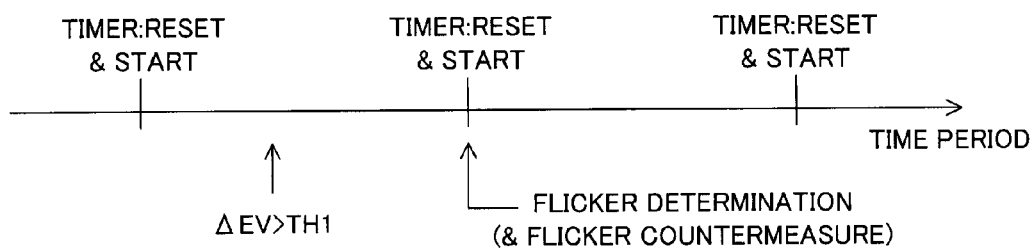
FIG. 3 is a timing chart showing one portion of an operation of a CPU applied to an embodiment in FIG. 1.

Therefore, the CPU 30 calculates, as the $\Delta EV$, a difference between an optimal EV value acquired one second earlier and a latest optimal EV value, repeats a reset & start of a timer TM (timer setting value: 10 seconds), and executes the flicker determining process as a condition of satisfying of $\Delta EV$>threshold value TH1 and time-out of the timer TM. The flicker determining process is executed according to a procedure shown in FIG. 3. Thereby, it becomes possible to quickly prevent the generation of the flicker while inhibiting an increase of the load resulting from the flicker determination.

Figure 4:
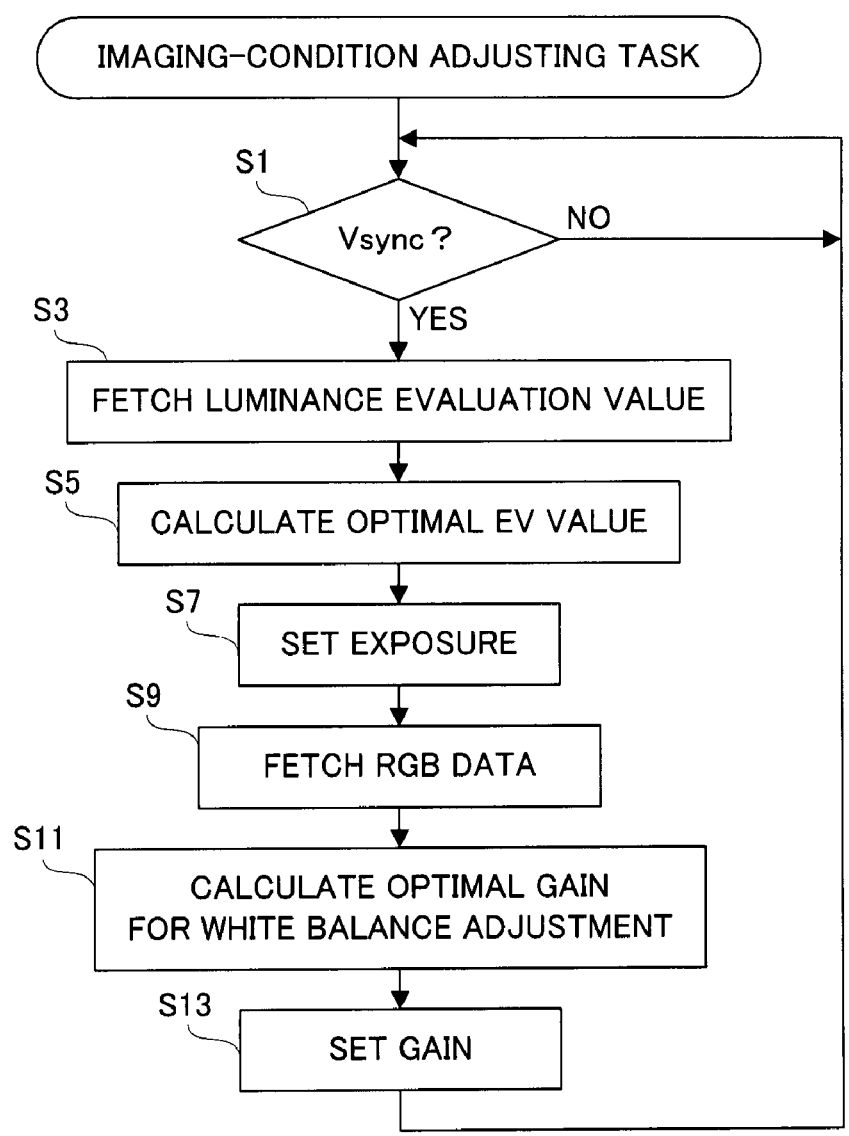
FIG. 4 is a flowchart showing one portion of the operation of the CPU applied to the embodiment in FIG. 1.
Figure 5:
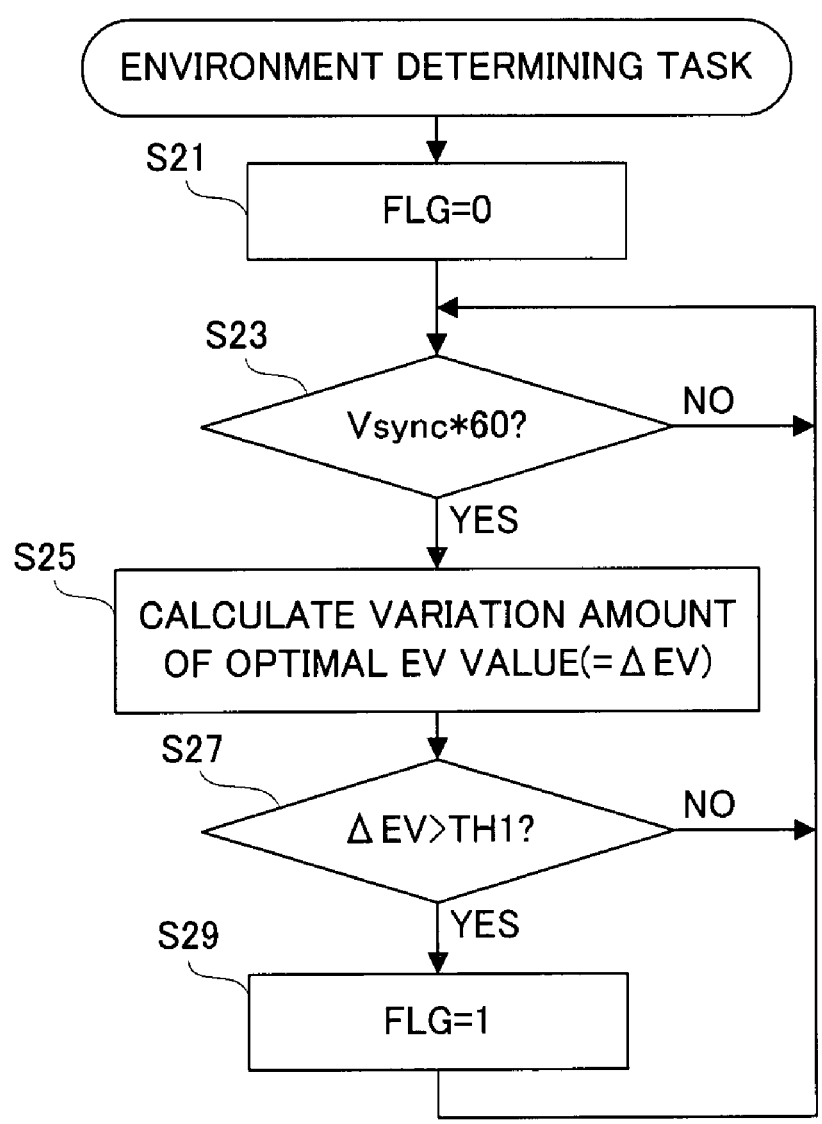
FIG. 5 is a flowchart showing another portion of the operation of the CPU applied to the embodiment in FIG. 1.
Figure 6:
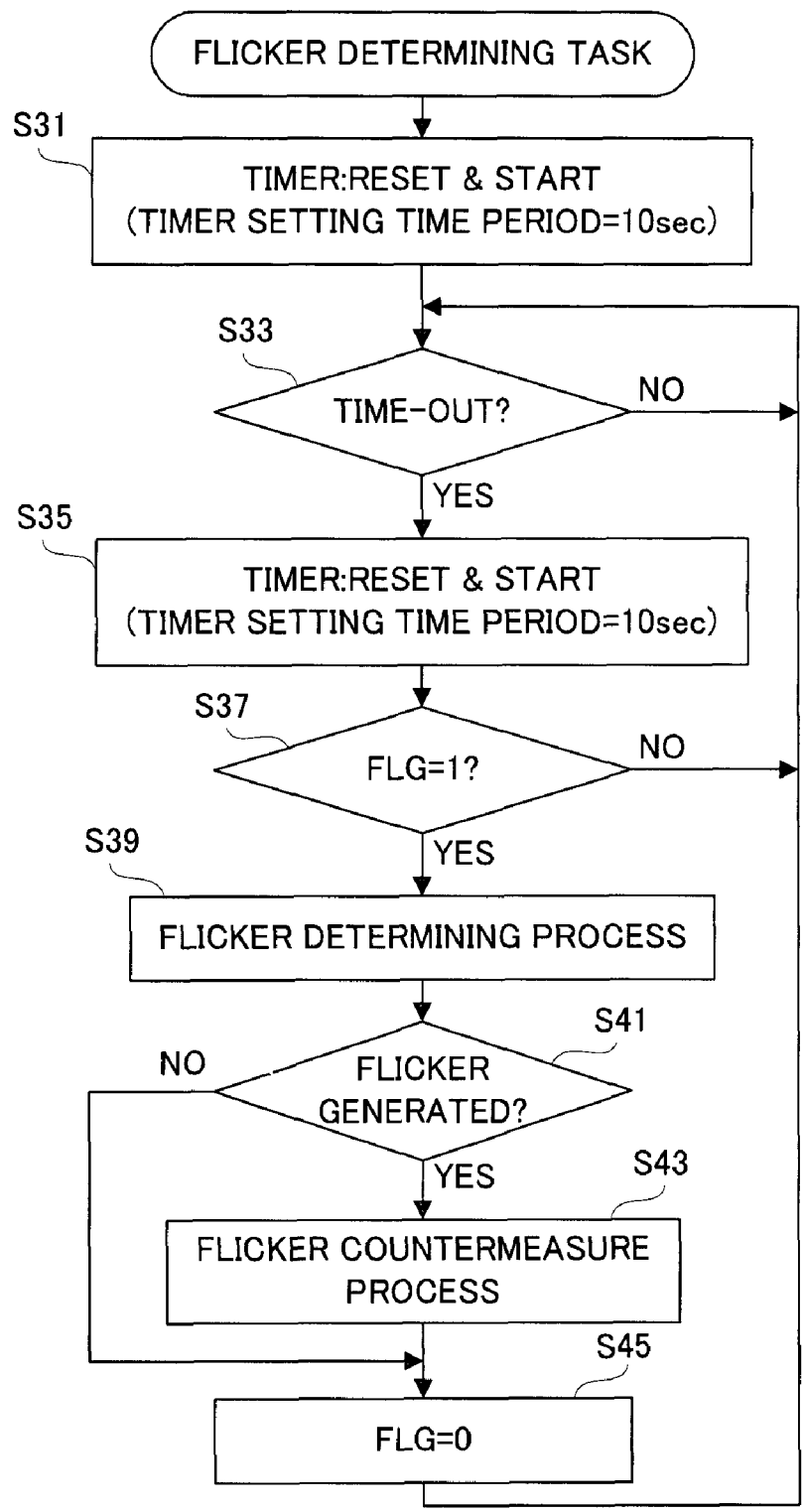
FIG. 6 is a flowchart showing still another portion of the operation of the CPU applied to the embodiment in FIG. 1.

The CPU 30 executes a plurality of tasks including an imaging condition task shown in FIG. 4, an environment determining task shown in FIG. 5, and a flicker determining task shown in FIG. 6, in a parallel manner. It is noted that these tasks are stored in the flash memory 44 shown in FIG. 1.

With reference to FIG. 4, it is determined in a step S1 whether or not the vertical synchronization signal Vsync is generated, and when YES is determined, the luminance evaluation value is fetched from the luminance evaluation circuit 28 in a step S3. In a step S5, based on the fetched luminance evaluation value, the optimal EV value is calculated, and in a step S7, the aperture amount and the exposure time period that define the calculated optimal EV value are set to the aperture unit 14 and the TG 22, respectively. In a step S9, the RGB-formatted image data outputted from the white-balance adjusting circuit 26w is fetched. In a step S11, based on the fetched image data, the optimal gain for a white balance adjustment is calculated, and in a step S13, the calculated optimal gain is set to the white-balance adjusting circuit 26w. Upon completion of the process in the step S13, the process returns to the step S1.

With reference to FIG. 5, in a step S21, a flag FLG is set to "0", and in a step S23, it is determined whether or not the vertical synchronization signals Vsync are generated for 60 times (whether or not one second is elapsed from an immediately preceding process). When YES is determined in this step, the process advances to a step S25 to calculate, as $\Delta EV$, the difference between the optimal EV value acquired one second earlier and the latest optimal EV value. In a step S27, it is determined whether or not the calculated difference ΔEV exceeds the threshold value TH1. When NO is determined, the process directly returns to the step S23, and on the other hand, when YES is determined, the process sets the flag FLG to "1" in a step S29, and then, returns to the step S23.

With reference to FIG. 6, the reset & start of the timer TM is executed in a step 31. A numerical value equivalent to "10 seconds" is set to the timer TM, and the set numerical value is decreased concurrently with a time period. In a step S33, it is determined whether or not the time-out is generated (whether or not 10 seconds are elapsed from the resetting and starting). When YES is determined in this step, a process similar to that in the step S31 is executed in a step S35, and a state of the flag FLG is determined in a step S37.

When the flag FLG indicate "0", the process returns to the step S33, and when the flag FLG indicates "1", the process advances to a step S39. In the step S39, the flicker determining process is executed during a period of several flames to ten-odd frames, and in a step S41, it is determined whether or not a result of the flicker determining process indicates the generation of the flicker. When NO is determined in this step, the process-directly advances to a step S45, and on the other hand, when YES is determined, the process executes the flicker countermeasure process in a step S43, and then, advances to a step S45. In the step S45, the flag FLG is returned to "0", and thereafter, the process returns to the step S33.

As is apparent from the above description, the image sensor 16 has the imaging surface irradiated with the optical image of the object scene, and repeatedly generates the object scene image. The CPU 30 repeatedly determines whether or not a specific variation exceeding a reference (variation of ΔEV>TH1) is generated in the object scene captured by the image sensor 16, in parallel with a generation process of the object scene image by the image sensor 16 (S27). When a determination result is updated from a negative result to an affirmative result the CPU 30 waits for an elapse of a designated period (remaining time period of the timer TM), then, executes the flicker determining process (S39), and executes the flicker countermeasure process, as needed (S43).

Thus, the flicker determining process is executed when the specific variation exceeding the reference is generated in the object scene. In other words, unless the specific variation is generated, the flicker determining process is suspended. Thereby, it becomes possible to quickly prevent the generation of the flicker while inhibiting the increase of the load resulting from the flicker determination.

It is noted that in this embodiment, a time period set to the timer TM in each of the steps S31 and S35 is a fixed value (=10 seconds) and a waiting time period from the flag FLG is updated to "1" until the flicker determining process is executed (=designated time period) is a remaining time period of the timer TM. This waiting time period may be changed according to a variation amount of the object scene. In this case, the CPU 30 preferably executes processes in steps S51 to S59 shown in FIG. 7 instead of the processes in the steps S31 to S37 shown in FIG. 6.

Figure 7:
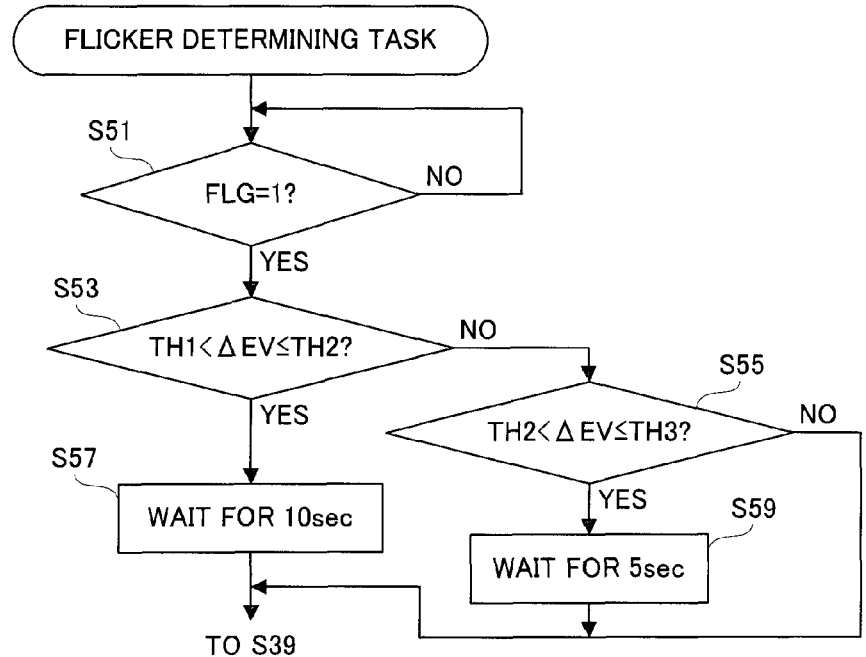
FIG. 7 is a flowchart showing one portion of the operation of the CPU applied to another embodiment of the present invention.

With reference to FIG. 7, in the step S51, it is determined whether or not the flag FLG indicates "1", and when YES is determined, a magnitude of the difference ΔEV is determined in each of the steps S53 and S55. When the difference ΔEV exceeds the threshold value TH1 and is equal to or less than a threshold value TH2, YES is determined in the step S53. Subsequently, the process waits for 10 seconds in the step S57, and then, advances to the step S39. When the difference ΔEV exceeds the threshold value TH2 and is equal to or less than a threshold value TH3, YES is determined in the step S55. Subsequently, the process waits for 5 seconds in the step S59, and then, advances to the step S39. When the difference ΔEV exceeds the threshold value TH3, NO is determined in the step S55, and the process directly advances to the step S39. Thereby, it becomes possible to change a responsive characteristic of the flicker determining process according to the variation amount of the object scene.

It is noted that in the processes shown in FIG. 7, the greater the variation of the object scene, the more shortened the waiting time period. However, it may be possible that the greater the variation of the object scene, the more extended the waiting time period.

Also, in this embodiment a precision of the flicker determining process is not particularly associated with the variation amount of the object scene. However, the precision of the flicker determining process (that is, a time period spent on the flicker determining process) may be changed according to the variation amount of the object scene. In this case, the CPU 30 preferably executes processes in steps S61 to S71 shown in FIG. 8 instead of the processes in the steps S31 to S37 shown in FIG. 6.

Figure 8:
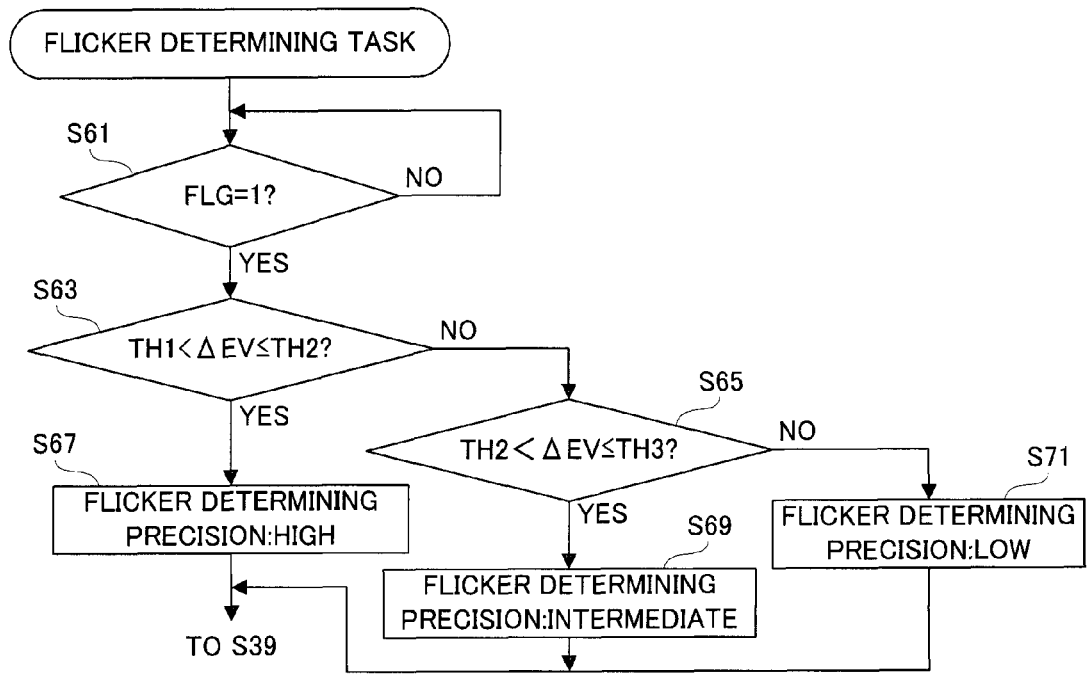
FIG. 8 is a flowchart showing another portion of the operation of the CPU applied to still another embodiment of the present invention.

With reference to FIG. 8, the processes in the steps S61 to S65 are the same as those in the steps S51 to S55 shown in FIG. 7, and thus the duplicated description is omitted. When YES is determined in the step S63, a flicker determining precision is set to "high" in the step S67; when YES is determined in the step S65, the flicker determining precision is set to "intermediate" in the step S69; and when NO is determined in the step S65, the flicker determining precision is set to "low" in the step S71. The time period spent on the flicker determining process in the step S39 is shortened concurrently with a decrease of the flicker determining precision. Thereby, it becomes possible to change the responsive characteristic of the flicker countermeasure process according to the variation amount of the object scene.

It is noted that in the processes shown in FIG. 8, the greater the variation of the object scene, the more lowered the precision. However, it may be possible that the greater the variation of the object scene, the more improved the precision. Also, the process in the step S57 shown in FIG. 7 may be executed simultaneously of the process in the step S67, and the process in the step S59 shown in FIG. 7 may be executed simultaneously of the process in the step S69.

Furthermore, in this embodiment, when the variation amount of the optimal EV value exceeds the threshold value TH1, the flag FLG is set to "1". However, the flag FLG may be controlled with reference to the variation amount of the optimal gain for a white balance adjustment In this case, processes in steps S25' to S27' shown in FIG. 9 may be preferably executed instead of the processes in the steps S25 to S27 shown in FIG. 5.

Figure 9:
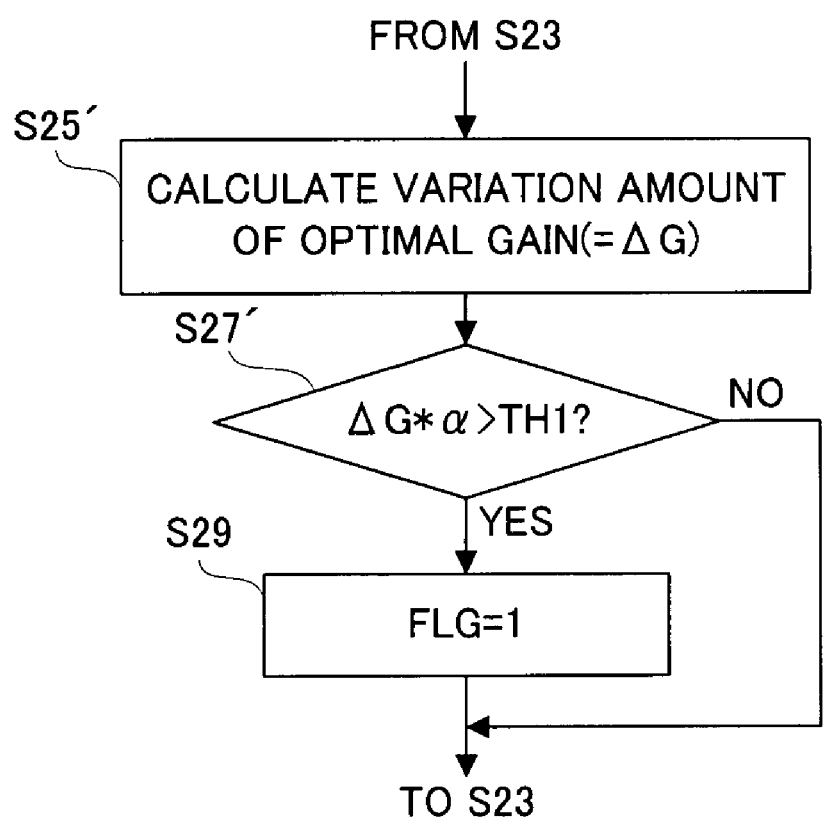
FIG. 9 is a flowchart showing another portion of the operation of the CPU applied to yet still another embodiment of the present invention.

With reference to FIG. 9, a difference between an optimal gain acquired one second earlier and a latest optimal gain is calculated as ΔG in the step S25'. In the step S27', it is determined whether or not a value that is α times the calculated difference ΔG exceeds the threshold value TH1; and when YES is determined in this step, the flag FLG is set to "1" in the step S29. Thereby, when a tone of color of the object scene is greatly varied, the flicker determining process is executed.

Furthermore, in this embodiment the CMOS-type image sensor is used. However, instead thereof, a CCD-type image sensor may be used. Also, in this embodiment a generation cycle of the vertical-synchronization signal Vsync is assumed to be 1/60 seconds. However the generation cycle of the vertical synchronization signal Vsync is not limited thereto.

Additionally, according to FIG. 2(A) and FIG. 2(B), a generation time of the vertical synchronization signal is consistent with an exposure start time. However, an exposing operation may be controlled such that the generation time of the synchronization signal is consistent with an exposure end time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:
    an imager, having an imaging surface irradiated with an optical image representing a scene, which outputs electronic images corresponding to the optical image with a first period;
    a determiner which determines whether or not a flicker occurs based on the electronic images outputted from said imager;
    a processor which executes a flicker countermeasure process when a determination result of said determiner indicates occurrence of the flicker;
    a calculator which calculates a variation amount of the scene based the electronic images outputted from said imager with a second period which is longer than the first period;
    an activator which activates said determiner in a case where the variation amount calculated by said calculator exceeds a reference; and
    a suspender which suspends said determiner being activated by said activator in response to an output of a determination result indicating non-occurrence of the flicker from said determiner or a completion of the flicker countermeasure process.

2. A video camera according to claim 1, wherein said activator activates said determiner at a time point at which a designated period is elapsed from the variation amount having exceeded the reference.

3. A video camera according to claim 2, further comprising a period changer which changes a length of the designated period depending upon a magnitude of the variation amount calculated by said calculator.

4. A video camera according to claim 1, further comprising a precision changer which changes a determining precision of said determiner depending upon a magnitude of the variation amount calculated by said calculator.

5. A video camera according to claim 1, further comprising an adjustor which repeatedly adjusts an imaging parameter based on the electronic images outputted from said imager, wherein the variation amount calculated by said calculator is equivalent to a difference between imaging parameters adjusted by said adjuster corresponding to the second period.

6. A video camera according to claim 5, wherein said imaging parameter includes an exposure amount.

7. A video camera according to claim 5, wherein said imaging parameter includes a white-balance adjustment gain.

8. A computer program embodied in a tangible medium, which is executed by a processor of a video camera comprising an imager, having an imaging surface irradiated with an optical image representing a scene, which outputs electronic images corresponding to the optical image with a first period, the program, comprising:
    a determining step of determining whether or not a flicker occurs based on the electronic images outputted from said imager;
    a processing step of executing a flicker countermeasure process when a determination result of said determining step indicates occurrence of the flicker;
    a calculating step of calculating a variation amount of the scene based on the electronic images outputted from said imager with a second period which is longer than the first period;
    an activating step of activating said determining step in a case where the variation amount calculated by said calculating step exceeds a reference; and
    a suspending step of suspending said determining step being activated by said activating step in response to an output of a determination result indicating non-occurrence of the flicker from said determining step or a completion of the flicker countermeasure process.

9. An imaging control method executed by a video camera comprising an imager, having an imaging surface irradiated with an optical image representing a scene, which outputs electronic images corresponding to the optical image with a first period, the imaging control method, comprising:
    a determining step of determining whether or not a flicker occurs based on the electronic images outputted from said imager;
    a processing step of executing a flicker countermeasure process when a determination result of said determining step indicates occurrence of the flicker;
    a calculating step of calculating a variation amount of the scene based on the electronic images outputted from said imager with a second period which is longer than the first period;
    an activating step of activating said determining step in a case where the variation amount calculated by said calculating step exceeds a reference; and
    a suspending step of suspending said determining step being activated by said activating step in response to an output of a determination result indicating non-occurrence of the flicker from said determining step or a completion of the flicker countermeasure process.

* * * * *